United States Patent
Bondesen et al.

(10) Patent No.: US 9,600,817 B2
(45) Date of Patent: *Mar. 21, 2017

(54) FOREIGN EXCHANGE TOKEN

(71) Applicant: BANK OF AMERICA CORPORATION, Charlotte, NC (US)

(72) Inventors: Laura Corinne Bondesen, Charlotte, NC (US); Jason P. Blackhurst, Charlotte, NC (US); Scott Lee Harkey, Concord, NC (US); William Blakely Belchee, Charlotte, NC (US); Tammy L. Brunswig, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,257

(22) Filed: Mar. 4, 2014

(65) Prior Publication Data

US 2015/0254652 A1 Sep. 10, 2015

(51) Int. Cl.
*G06Q 20/38* (2012.01)
*G06Q 40/04* (2012.01)
(Continued)

(52) U.S. Cl.
CPC ....... *G06Q 20/381* (2013.01); *G06Q 20/3224* (2013.01); *G06Q 20/367* (2013.01); *G06Q 40/04* (2013.01)

(58) Field of Classification Search
USPC .............. 705/16, 41, 39, 49, 64, 17
See application file for complete search history.

(56) References Cited

U.S. PATENT DOCUMENTS 3,119,103 A 1/1964 Fertig
3,254,000 A 5/1966 Chibret
(Continued)

FOREIGN PATENT DOCUMENTS

WO WO 2012058099 5/2012
WO WO 2013095486 6/2013

OTHER PUBLICATIONS

European Patent Application No. 01400506 filed on Feb. 28, 2001, and printed as document No. EP 1132876 A2 entitled "Electronic Wallet System with Secure Inter-purse Operations" by inventor Tang-Talpin et al.
(Continued)

*Primary Examiner* — Alexander Kalinowski
*Assistant Examiner* — Blane Lickteig
(74) *Attorney, Agent, or Firm* — Michael A. Springs; Moore & Van Allen PLLC; Nicholas C. Russell

(57) ABSTRACT

Embodiments disclosed herein relate to systems, methods, and computer program products for a system for providing a virtual value token. The system, method, and computer program product are configured to receive a request for a token associated with a virtual value; generate the token associated with the virtual value, wherein the virtual value is funded via a known currency; determine that a user is initiating a transaction using the token; determine a local currency for the transaction; convert, using a computing device processor, at least a portion of the virtual value into a converted amount in the local currency; and complete the transaction using the converted amount of the token. The virtual value may be based on a defined value, such as a known amount on a specific day, or a relative value, such as the current value of an underlying asset.

18 Claims, 5 Drawing Sheets

(51) Int. Cl.
   *G06Q 20/32*       (2012.01)
   *G06Q 20/36*       (2012.01)

(56)              References Cited

U.S. PATENT DOCUMENTS

| | | |
|---|---|---|
| 3,256,670 A | 6/1966 | Ennio |
| 3,330,546 A | 7/1967 | Bryan |
| 3,422,462 A | 1/1969 | Finnieston |
| 3,516,056 A | 6/1970 | Matthews |
| 3,651,168 A | 3/1972 | Stoessel et al |
| 3,658,393 A | 4/1972 | Luthi |
| 3,718,328 A | 2/1973 | Comstock |
| 3,748,367 A | 7/1973 | Lamme et al. |
| 4,766,293 A * | 8/1988 | Boston .............................. 705/41 |
| 5,438,186 A | 8/1995 | Nair et al. |
| 6,119,103 A | 9/2000 | Basch et al. |
| 6,254,000 B1 | 7/2001 | Degen et al. |
| 6,256,670 B1 | 7/2001 | Davies |
| 6,330,546 B1 | 12/2001 | Gopinathan et al. |
| 6,422,462 B1 | 7/2002 | Cohen |
| 6,516,056 B1 | 2/2003 | Justice et al. |
| 6,651,168 B1 | 11/2003 | Kao et al. |
| 6,658,393 B1 | 12/2003 | Basch et al. |
| 6,718,328 B1 | 4/2004 | Norris |
| 6,748,367 B1 | 6/2004 | Lee |
| 7,058,806 B2 | 6/2006 | Smeets et al. |
| 7,111,323 B1 | 9/2006 | Bhatia et al. |
| 7,136,835 B1 | 11/2006 | Flitcroft et al. |
| 7,177,838 B1 | 2/2007 | Ling |
| 7,328,189 B2 | 2/2008 | Ling |
| 7,337,144 B1 | 2/2008 | Blinn et al. |
| 7,398,250 B2 | 7/2008 | Blinn et al. |
| 7,596,530 B1 | 9/2009 | Glasberg |
| 7,606,560 B2 | 10/2009 | Labrou et al. |
| 7,610,040 B2 | 10/2009 | Cantini et al. |
| 7,627,505 B2 | 12/2009 | Yoshida et al. |
| 7,657,489 B2 | 2/2010 | Stambaugh |
| 7,693,771 B1 | 4/2010 | Zimmerman et al. |
| 7,698,221 B2 | 4/2010 | Blinn et al. |
| 7,698,443 B2 | 4/2010 | Yaffe et al. |
| 7,739,169 B2 | 6/2010 | Hammad |
| 7,742,967 B1 | 6/2010 | Keresman, III et al. |
| 7,783,281 B1 | 8/2010 | Cook et al. |
| 7,784,684 B2 | 8/2010 | Labrou et al. |
| 7,848,980 B2 | 12/2010 | Carlson |
| 7,992,779 B2 | 8/2011 | Phillips et al. |
| 8,012,219 B2 | 9/2011 | Mendez et al. |
| 8,032,932 B2 | 10/2011 | Speyer et al. |
| 8,171,531 B2 | 5/2012 | Buer |
| 8,245,915 B1 | 8/2012 | Ramachandran et al. |
| 8,249,805 B2 | 8/2012 | de Silva et al. |
| 8,307,413 B2 | 11/2012 | Smadja et al. |
| 8,327,428 B2 | 12/2012 | Bailey et al. |
| 8,327,429 B2 | 12/2012 | Speyer et al. |
| 8,346,666 B2 | 1/2013 | Lindelsee et al. |
| 8,380,177 B2 | 2/2013 | Laracey |
| 8,395,242 B2 | 3/2013 | Oliver et al. |
| 8,407,142 B1 | 3/2013 | Griggs |
| 8,423,466 B2 | 4/2013 | Lane |
| 8,498,940 B2 | 7/2013 | Pelegero et al. |
| 8,522,039 B2 | 8/2013 | Hyndman et al. |
| 8,572,689 B2 | 10/2013 | Radhakrishnan |
| 8,577,804 B1 | 11/2013 | Bacastow |
| 8,583,498 B2 | 11/2013 | Fried et al. |
| 8,584,251 B2 | 11/2013 | McGuire et al. |
| 8,589,271 B2 | 11/2013 | Evans |
| 8,590,008 B1 | 11/2013 | Ellmore |
| 8,595,812 B2 | 11/2013 | Bomar et al. |
| 8,620,790 B2 | 12/2013 | Priebatsch |
| 8,682,802 B1 | 3/2014 | Kannanari |
| 8,683,571 B2 | 3/2014 | Zapata et al. |
| 8,768,838 B1 | 7/2014 | Hoffman |
| 8,788,333 B2 | 7/2014 | Alba et al. |
| 8,788,429 B2 | 7/2014 | Ticken |
| 8,789,162 B2 | 7/2014 | Radhakrishnan |
| 8,839,383 B2 | 9/2014 | Van Horn |
| 8,850,575 B1 | 9/2014 | Magi Shaashua et al. |
| 8,930,271 B1 | 1/2015 | Ellis et al. |
| 8,943,574 B2 | 1/2015 | Bailey et al. |
| 8,973,102 B2 | 3/2015 | Jakobsson |
| 8,985,442 B1 | 3/2015 | Zhou et al. |
| 8,996,423 B2 | 3/2015 | Johnson et al. |
| 9,055,053 B2 | 6/2015 | Radhakrishnan et al. |
| 9,069,943 B2 | 6/2015 | Radhakrishnan et al. |
| 9,195,984 B1 | 11/2015 | Spector et al. |
| 2002/0111907 A1 | 8/2002 | Ling |
| 2002/0157029 A1 | 10/2002 | French et al. |
| 2002/0174073 A1 | 11/2002 | Nordman et al. |
| 2002/0186845 A1 | 12/2002 | Dutta et al. |
| 2003/0004866 A1 | 1/2003 | Huennekens et al. |
| 2003/0045328 A1 | 3/2003 | Natsuno |
| 2003/0061170 A1* | 3/2003 | Uzo .............................. 705/64 |
| 2003/0105714 A1* | 6/2003 | Alarcon-Luther ...... G06Q 20/00<br>705/41 |
| 2003/0163787 A1 | 8/2003 | Hay et al. |
| 2005/0222961 A1* | 10/2005 | Staib et al. ..................... 705/64 |
| 2006/0036868 A1 | 2/2006 | Cicchitto |
| 2006/0089893 A1 | 4/2006 | Joseph et al. |
| 2006/0206709 A1 | 9/2006 | Labrou et al. |
| 2006/0287004 A1* | 12/2006 | Fuqua .......................... 455/558 |
| 2007/0055594 A1 | 3/2007 | Rivest et al. |
| 2007/0100773 A1 | 5/2007 | Wallach |
| 2007/0156842 A1 | 7/2007 | Vermeulen et al. |
| 2007/0194884 A1 | 8/2007 | Didier et al. |
| 2007/0219984 A1 | 9/2007 | Aravamudan et al. |
| 2007/0223706 A1 | 9/2007 | Gantman et al. |
| 2007/0250920 A1 | 10/2007 | Lindsay |
| 2007/0276764 A1 | 11/2007 | Mann et al. |
| 2008/0109319 A1 | 5/2008 | Foss |
| 2008/0162338 A1 | 7/2008 | Samuels et al. |
| 2008/0162589 A1 | 7/2008 | Rodeheffer et al. |
| 2008/0167965 A1* | 7/2008 | Von Nothaus ......... G06Q 20/20<br>705/17 |
| 2008/0189210 A1* | 8/2008 | Sawhney ....................... 705/44 |
| 2008/0195499 A1* | 8/2008 | Meredith et al. ............... 705/26 |
| 2008/0275748 A1 | 11/2008 | John |
| 2008/0293397 A1 | 11/2008 | Gajdos et al. |
| 2008/0313087 A1 | 12/2008 | Joseph et al. |
| 2008/0319889 A1 | 12/2008 | Hammad |
| 2009/0006230 A1 | 1/2009 | Lyda et al. |
| 2009/0019534 A1 | 1/2009 | Bakshi et al. |
| 2009/0048953 A1 | 2/2009 | Hazel et al. |
| 2009/0057396 A1 | 3/2009 | Barbour et al. |
| 2009/0100529 A1 | 4/2009 | Livnat et al. |
| 2009/0119190 A1 | 5/2009 | Realini |
| 2009/0150286 A1 | 6/2009 | Barton |
| 2009/0164327 A1 | 6/2009 | Bishop et al. |
| 2009/0328186 A1 | 12/2009 | Pollutro et al. |
| 2010/0036741 A1 | 2/2010 | Cleven |
| 2010/0051686 A1 | 3/2010 | Obi |
| 2010/0064345 A1 | 3/2010 | Bentley et al. |
| 2010/0070376 A1 | 3/2010 | Proud et al. |
| 2010/0122333 A1 | 5/2010 | Noe |
| 2010/0241571 A1 | 9/2010 | McDonald |
| 2010/0257099 A1 | 10/2010 | Bonalle et al. |
| 2010/0268645 A1 | 10/2010 | Martino et al. |
| 2010/0312636 A1 | 12/2010 | Coulter et al. |
| 2011/0022483 A1 | 1/2011 | Hammad |
| 2011/0099104 A1 | 4/2011 | Nybom |
| 2011/0103586 A1 | 5/2011 | Nobre et al. |
| 2011/0137804 A1 | 6/2011 | Peterson |
| 2011/0143663 A1 | 6/2011 | Renard et al. |
| 2011/0166992 A1* | 7/2011 | Dessert ............. G06Q 20/0655<br>705/39 |
| 2011/0218907 A1 | 9/2011 | Dessert et al. |
| 2011/0251892 A1 | 10/2011 | Laracey |
| 2011/0277016 A1 | 11/2011 | Hockings et al. |
| 2012/0018506 A1 | 1/2012 | Hammad et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0030109 A1 | 2/2012 | Dooley Maley et al. |
| 2012/0054057 A1 | 3/2012 | O'Connell et al. |
| 2012/0158540 A1 | 6/2012 | Ganti et al. |

(56) References Cited

U.S. PATENT DOCUMENTS

| | | |
|---|---|---|
| 2012/0158586 A1 | 6/2012 | Ganti et al. |
| 2012/0160912 A1 | 6/2012 | Laracey |
| 2012/0166334 A1 | 6/2012 | Kimberg et al. |
| 2012/0171237 A1 | 7/2012 | Ching et al. |
| 2012/0179558 A1 | 7/2012 | Fischer |
| 2012/0197743 A1 | 8/2012 | Grigg et al. |
| 2012/0197794 A1 | 8/2012 | Grigg et al. |
| 2012/0203700 A1 | 8/2012 | Ornce et al. |
| 2012/0252365 A1 | 10/2012 | Lam |
| 2012/0254941 A1 | 10/2012 | Levien et al. |
| 2012/0265688 A1 | 10/2012 | Dinan |
| 2012/0271712 A1 | 10/2012 | Katzin et al. |
| 2012/0290482 A1 | 11/2012 | Atef et al. |
| 2012/0316992 A1 | 12/2012 | Oborne |
| 2012/0317034 A1 | 12/2012 | Guha et al. |
| 2012/0323783 A1 | 12/2012 | Canetto |
| 2012/0330846 A1 | 12/2012 | Light et al. |
| 2013/0013499 A1 | 1/2013 | Kalgi |
| 2013/0018738 A1* | 1/2013 | Faires et al. ............... 705/16 |
| 2013/0018791 A1 | 1/2013 | Mendicino et al. |
| 2013/0024360 A1 | 1/2013 | Ballout |
| 2013/0036000 A1 | 2/2013 | Giordano et al. |
| 2013/0036048 A1 | 2/2013 | Campos et al. |
| 2013/0054336 A1 | 2/2013 | Graylin |
| 2013/0054470 A1 | 2/2013 | Campos et al. |
| 2013/0085927 A1* | 4/2013 | Scott ............... G06Q 20/32 705/39 |
| 2013/0097683 A1 | 4/2013 | Davis et al. |
| 2013/0110658 A1 | 5/2013 | Lyman et al. |
| 2013/0124346 A1 | 5/2013 | Baldwin et al. |
| 2013/0159178 A1 | 6/2013 | Colon et al. |
| 2013/0166332 A1 | 6/2013 | Hammad |
| 2013/0179341 A1 | 7/2013 | Boudreau |
| 2013/0179954 A1 | 7/2013 | Bidare |
| 2013/0191227 A1 | 7/2013 | Pasa et al. |
| 2013/0204775 A1 | 8/2013 | Midkiff et al. |
| 2013/0204787 A1 | 8/2013 | Dubois |
| 2013/0212007 A1 | 8/2013 | Mattsson et al. |
| 2013/0212019 A1 | 8/2013 | Mattsson et al. |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254115 A1 | 9/2013 | Pasa et al. |
| 2013/0262315 A1 | 10/2013 | Hruska |
| 2013/0268437 A1 | 10/2013 | Desai et al. |
| 2013/0304637 A1 | 11/2013 | McCabe et al. |
| 2013/0304651 A1 | 11/2013 | Smith |
| 2013/0318627 A1 | 11/2013 | Lundkvist et al. |
| 2013/0346302 A1 | 12/2013 | Purves et al. |
| 2014/0006273 A1 | 1/2014 | Gopinath et al. |
| 2014/0012647 A1 | 1/2014 | Hecht |
| 2014/0025581 A1 | 1/2014 | Calman |
| 2014/0025958 A1 | 1/2014 | Calman |
| 2014/0122331 A1 | 5/2014 | Vaish et al. |
| 2014/0129357 A1* | 5/2014 | Goodwin ............... G06Q 30/02 705/16 |
| 2014/0130127 A1 | 5/2014 | Toole et al. |
| 2014/0143089 A1 | 5/2014 | Campos et al. |
| 2014/0143145 A1 | 5/2014 | Kortina |
| 2014/0164243 A1 | 6/2014 | Aabye et al. |
| 2014/0172707 A1 | 6/2014 | Kuntagod et al. |
| 2014/0187148 A1 | 7/2014 | Taite et al. |
| 2014/0188719 A1 | 7/2014 | Poornachandran et al. |
| 2014/0208401 A1 | 7/2014 | Balakrishnan et al. |
| 2014/0214640 A1 | 7/2014 | Mallikarjunan et al. |
| 2014/0244493 A1 | 8/2014 | Kenyon et al. |
| 2014/0244503 A1 | 8/2014 | Sadlier |
| 2014/0245391 A1 | 8/2014 | Adenuga |
| 2014/0250009 A1 | 9/2014 | Carlson |
| 2014/0279476 A1 | 9/2014 | Hua |
| 2014/0279554 A1 | 9/2014 | Priebatsch et al. |
| 2014/0279566 A1 | 9/2014 | Verma et al. |
| 2014/0310764 A1 | 10/2014 | Tippett et al. |
| 2014/0315159 A1 | 10/2014 | Mukherjee et al. |
| 2014/0330721 A1 | 11/2014 | Wang |
| 2014/0337175 A1 | 11/2014 | Katzin et al. |
| 2014/0344153 A1 | 11/2014 | Raj et al. |
| 2015/0019317 A1 | 1/2015 | Mitchell |
| 2015/0019439 A1 | 1/2015 | Phillips |
| 2015/0032621 A1 | 1/2015 | Kar et al. |
| 2015/0032625 A1 | 1/2015 | Dill et al. |
| 2015/0032627 A1 | 1/2015 | Dill et al. |
| 2015/0039601 A1 | 2/2015 | Harrang et al. |
| 2015/0081557 A1 | 3/2015 | Kinfoil et al. |
| 2015/0081567 A1 | 3/2015 | Boyle et al. |
| 2015/0100495 A1 | 4/2015 | Salama et al. |
| 2015/0120569 A1 | 4/2015 | Belshe et al. |
| 2015/0120572 A1 | 4/2015 | Slade |
| 2015/0161610 A1 | 6/2015 | Sahadevan et al. |
| 2015/0170149 A1 | 6/2015 | Sharma et al. |
| 2015/0199679 A1 | 7/2015 | Palanisamy et al. |
| 2015/0206137 A1 | 7/2015 | Mazarim Fernandes |
| 2015/0220914 A1 | 8/2015 | Purves et al. |
| 2015/0254648 A1 | 9/2015 | Clements et al. |
| 2015/0254650 A1 | 9/2015 | Bondesen et al. |
| 2015/0254653 A1 | 9/2015 | Bondesen et al. |
| 2015/0254664 A1 | 9/2015 | Bondesen et al. |

OTHER PUBLICATIONS

Simon, "Credit-Card Reward Programs: A Short History"; Creditcards.com, Nov. 2006, 4 pages.

Lane, "History of APIs"; APIEvangelist.com; Dec. 2012, 11 pages.

* cited by examiner

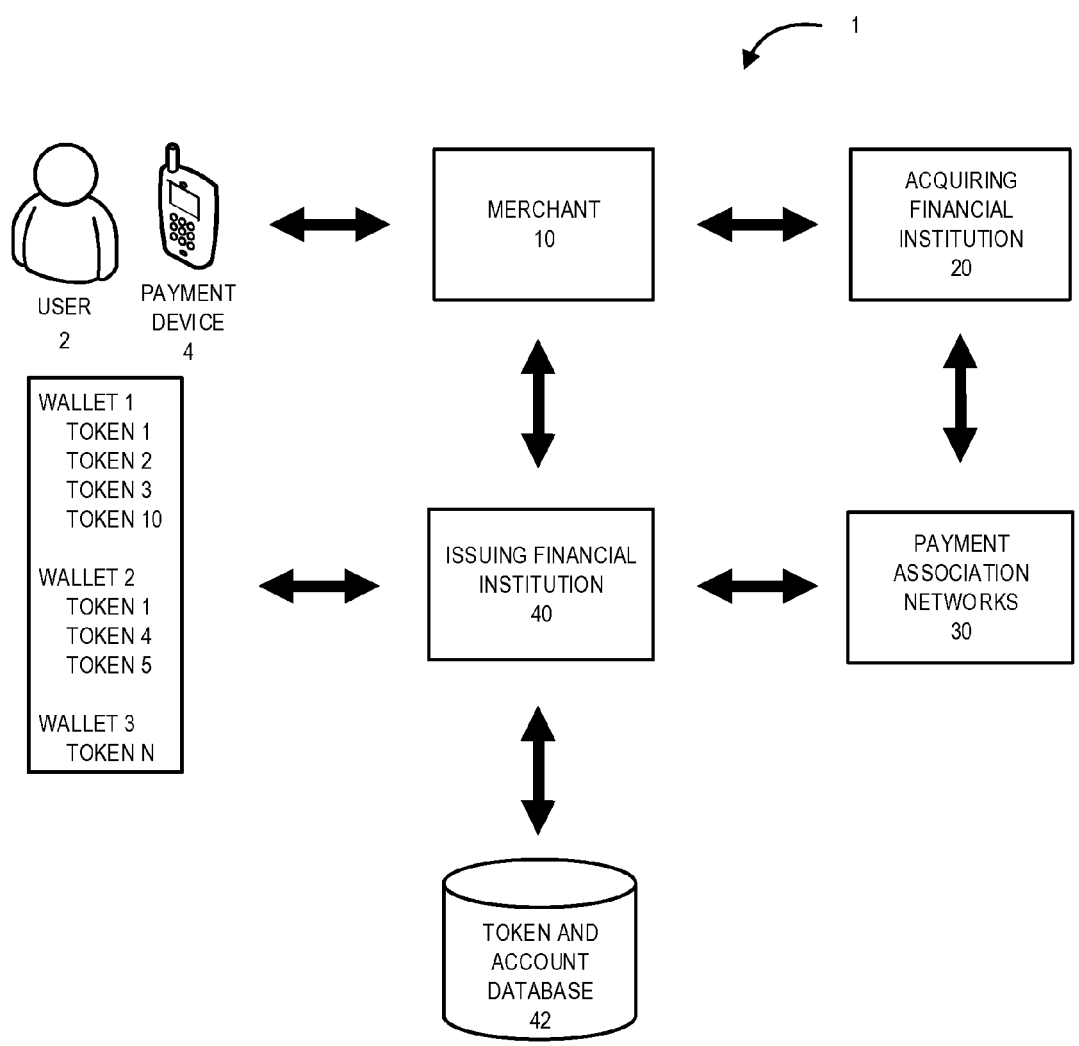

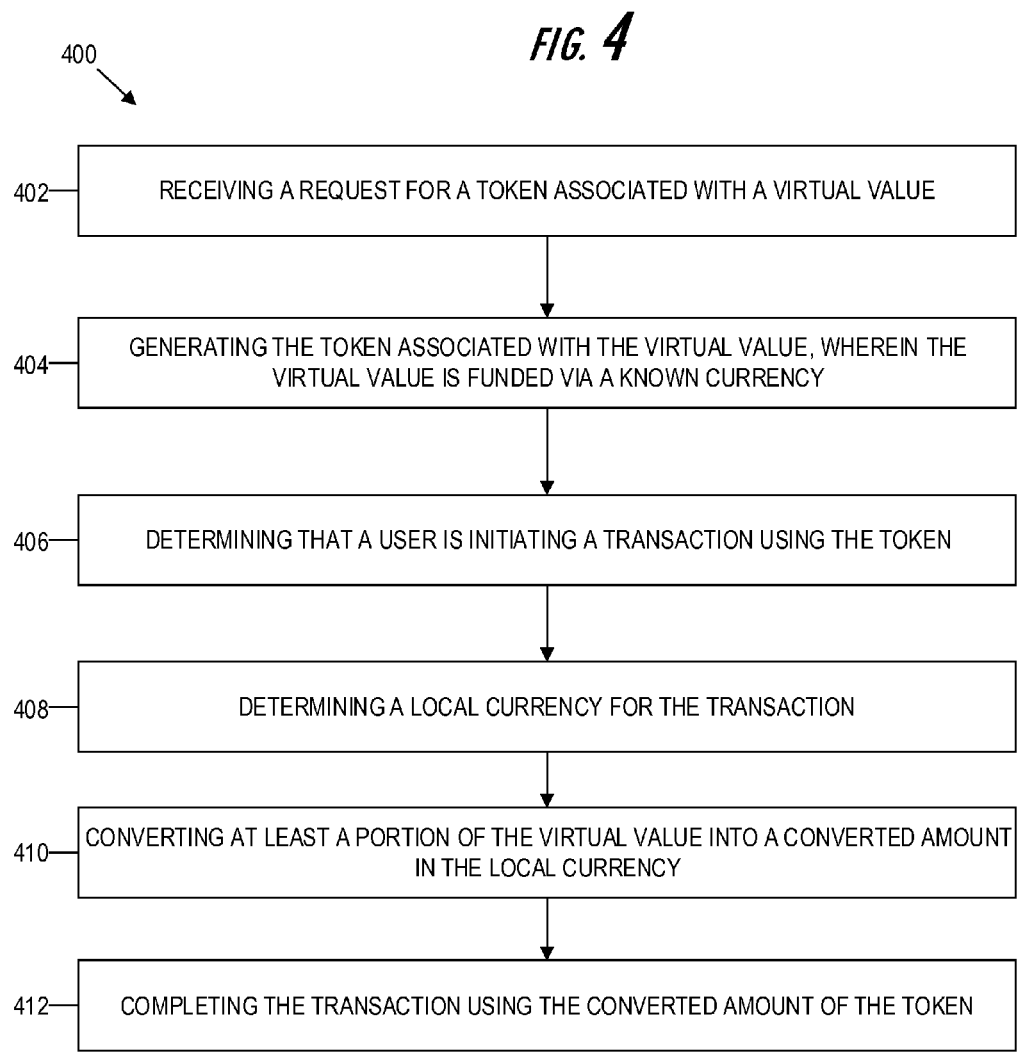

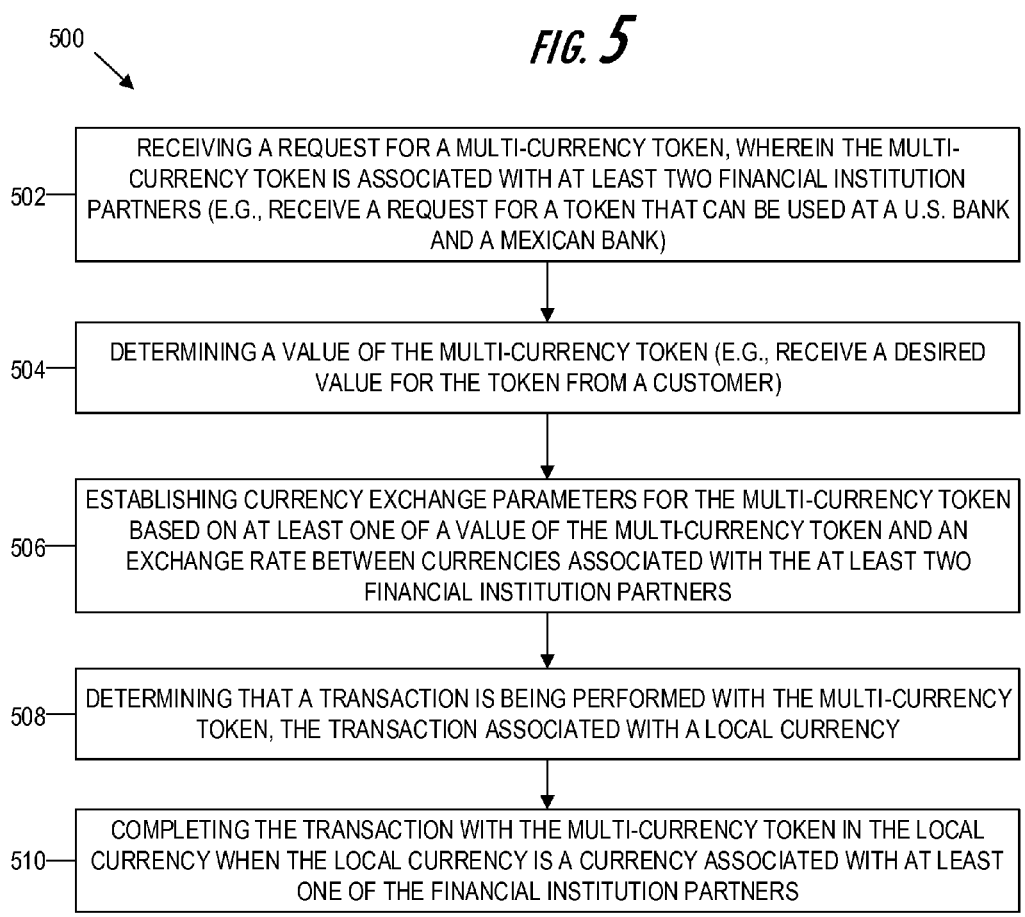

FOREIGN EXCHANGE TOKEN

BACKGROUND

Given the ease of international travel, financial institution customers are performing more transactions in different countries and in different currencies than previously. In the past, customers would convert money prior to traveling to a foreign country in order to conduct transactions in the local currency. Customers would need to remember to convert money, estimate how much money to convert, and deal with changing transaction rates, charges, and carrying large sums of money when traveling Credit cards may also permit customers to conduct transactions in foreign currencies but the credit card number must be released to the merchant. Credit cards use the customer's actual account number to conduct transactions in the currency of the issuing bank, which then converts the funds in the customer's account to an equivalent amount at a later date.

Thus, there is a need for a system and method that can assist users in conducting transactions in more than one currency.

BRIEF SUMMARY

The following presents a simplified summary of one or more embodiments of the disclosure in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments disclosed herein address the above needs and/or achieve other advantages by providing an apparatus (e.g., a system, computer program product, and/or other device) and a computer-implemented method for providing a virtual value token and/or a foreign cross-issued token. The virtual value token permits a user to conduct transactions in various currencies without first transferring an amount from one currency to another currency. Instead, the conversion occurs at the time of the transaction. The foreign cross-issued token permits a user to issue tokens having value denominated in more than one currency and therefore increases certainty regarding conversion rates and the like. The user is able to perform transactions in any of the currencies associated with the foreign cross-issued token without converting the currency at the time of the transaction.

In a first aspect, an apparatus for use in a token-based financial transaction system is provided, whereby the apparatus converts a virtual value token into a local currency to complete a financial transaction. In some embodiments, the apparatus includes a memory; a computing processor; and a module stored in the memory, said module comprising instruction code executable by one or more computing processors, and configured to cause the one or more computing processors to perform a variety of steps. In some embodiments, the apparatus receives a request for a token having a virtual value, wherein the request includes a funding source for the token and wherein the token may be used to complete a financial transaction; generates the token having the virtual value, wherein the virtual value is an amount available to use in a financial transaction and wherein the virtual value is funded via a known currency from the funding source; determines that a user is initiating a transaction using the token, wherein the apparatus receives the token during the initiation of the transaction but prior to completion of the transaction; determines a local currency for the transaction; determines a conversion rate between the local currency and the virtual value; converts at least a portion of the amount of token into a converted amount in the local currency based at least in part on the conversion rate; and completes the transaction using the converted amount of the token.

In some embodiments, the virtual value is a defined value comprising an amount used to fund the virtual value and a date that the virtual value was funded. In further embodiments, the virtual value is a relative value comprising an underlying asset that varies in value. In an embodiment, the token is denominated in units of the underlying asset. In a still further embodiment, converting at least a portion of the relative value into a converted amount in the local currency includes determining a total amount of the transaction; determining that the virtual value is greater than or equal to the total amount of the transaction; and converting an amount of the virtual value equivalent to the total amount of the transaction into the local currency.

In an embodiment, completing the transaction using the converted amount of the token includes transferring funds to a merchant in the local currency. In some embodiments, the local currency is determined using a global positioning system to determine a location of the transaction and a database comprising local currencies based on the location.

In a second aspect, a computer program product for use in a token-based financial transaction system is provided, whereby the apparatus converts a virtual value token into a local currency to complete a financial transaction. In some embodiments, the computer program product includes a non-transitory computer-readable medium including an executable portion for causing a computer to receive a request for a token having a virtual value, wherein the request includes a funding source for the token and wherein the token may be used to complete a financial transaction; an executable portion for causing a computer to generate the token having the virtual value, wherein the virtual value is an amount available to use in a financial transaction and wherein the virtual value is funded via a known currency from the funding source; an executable portion for causing a computer to determine that a user is initiating a transaction using the token, wherein the apparatus receives the token during the initiation of the transaction but prior to completion of the transaction; an executable portion for causing a computer to determine a local currency for the transaction; an executable portion for causing a computer to determine a conversion rate between the local currency and the virtual value; an executable portion for causing a computer to convert at least a portion of the amount of token into a converted amount in the local currency based at least in part on the conversion rate; and an executable portion for causing a computer to complete the transaction using the converted amount of the token.

In a third aspect, a computer-implemented method for use in a token-based financial transaction system is provided, whereby the apparatus converts a virtual value token into a local currency to complete a financial transaction. In some embodiments, the method includes receiving a request for a token having a virtual value, wherein the request includes a funding source for the token and wherein the token may be used to complete a financial transaction; generating the token having the virtual value, wherein the virtual value is an amount available to use in a financial transaction and wherein the virtual value is funded via a known currency from the funding source; determining that a user is initiating a transaction using the token, wherein the apparatus receives the token during the initiation of the transaction but prior to completion of the transaction; determining a local currency for the transaction; determining a conversion rate between the local currency and the virtual value; convert at least a portion of the amount of token into a converted amount in the local currency based at least in part on the conversion rate; and completing the transaction using the converted amount of the token.

Other aspects and features, as recited by the claims, will become apparent to those skilled in the art upon review of the following non-limited detailed description of the disclosure in conjunction with the accompanying figures.

BRIEF DESCRIPTION OF THE SEVERAL VIEWS OF THE DRAWINGS

Figure 1:
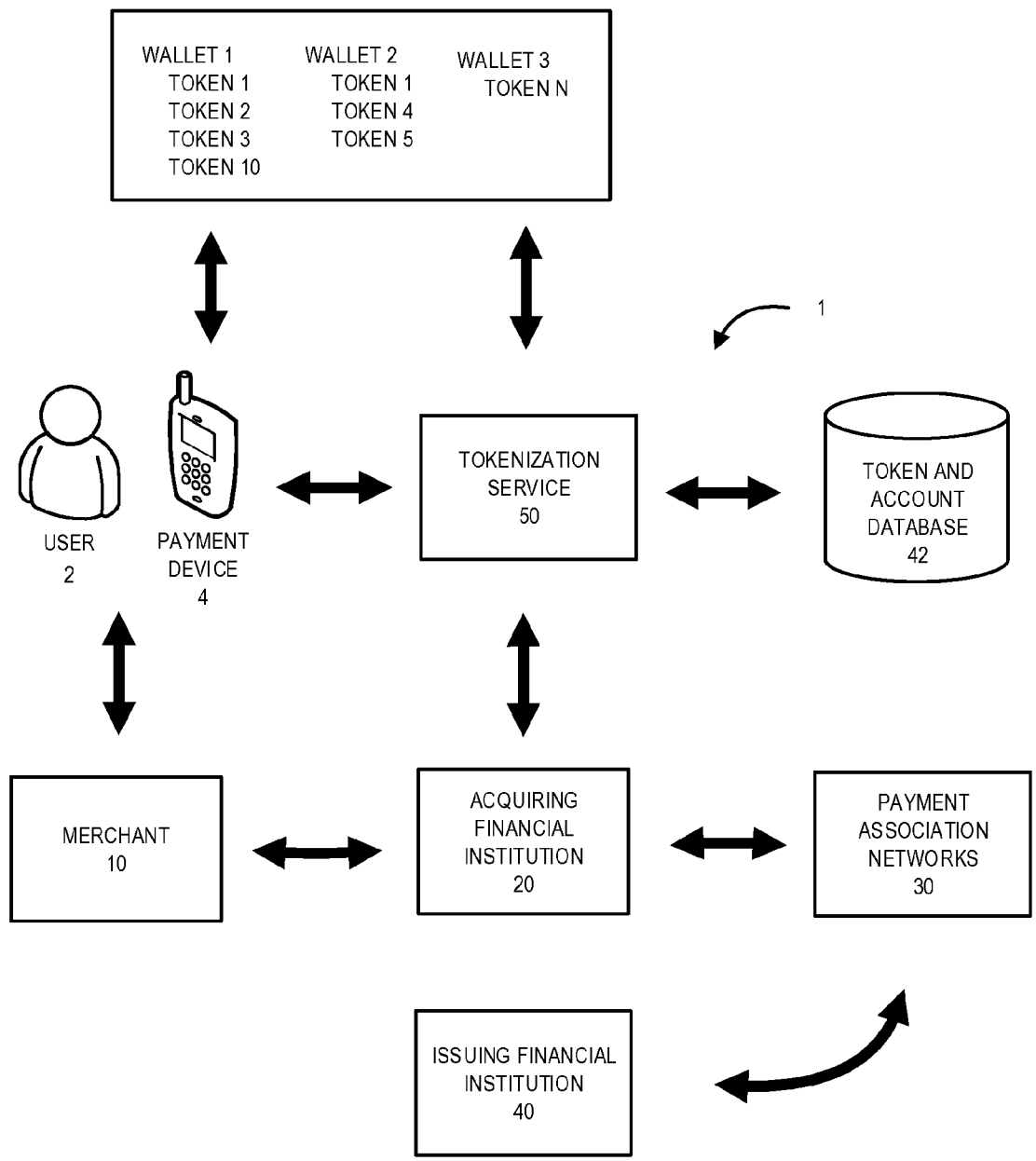
Figure 2:
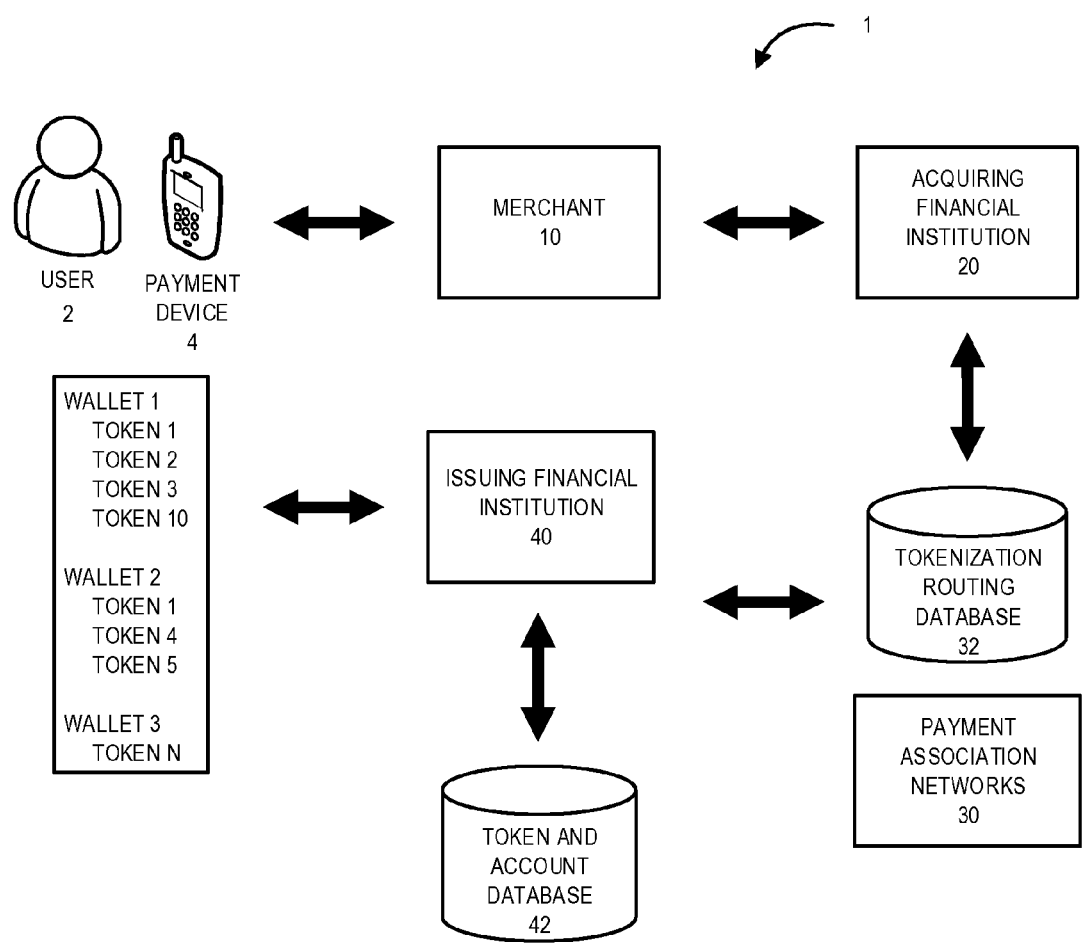

Having thus described embodiments in general terms, reference will now be made to the accompanying drawings, which are not necessarily drawn to scale, and wherein:

FIG. 1 provides a token system process wherein the token system process 1 is used in association with a tokenization service, in accordance with one embodiment of the present disclosure;

FIG. 2 provides a token system process in which the user may utilize a payment device (or payment instrument over the Internet) to enter into transactions with merchants utilizing tokens instead of user account numbers, in accordance with one embodiment of the present disclosure;

FIG. 3 provides a token system process in which the user may utilize a payment device (or payment instrument over the Internet) to enter into transactions with a merchant utilizing a token instead of a user account number and/or other user account information, in accordance with one embodiment of the present disclosure;

FIG. 4 provides a flow chart of a method of providing a foreign exchange token, in accordance with one embodiment of the present disclosure; and FIG. 5 provides a flow chart of a method of providing a foreign cross-issued token, in accordance with one embodiment of the present disclosure.

DETAILED DESCRIPTION

Embodiments will now be described more fully hereinafter with reference to the accompanying drawings, in which some, but not all, embodiments are shown. Indeed, the disclosure may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as comprising one or more elements, the methods or elements may also consist of or consist essentially of the elements disclosed herein.

It should be understood that terms like "bank," "financial institution," and "institution" are used herein in their broadest sense. Institutions, organizations, or even individuals that process financial transactions are widely varied in their organization and structure. Terms like "financial institution" are intended to encompass all such possibilities, including but not limited to banks, finance companies, stock brokerages, credit unions, savings and loans, mortgage companies, insurance companies, and/or the like. Additionally, disclosed embodiments may suggest or illustrate the use of agencies or contractors external to the financial institution to perform some of the calculations, data delivery services, and/or authentication services. These illustrations are examples only, and an institution or business can implement the entire method and system on their own computer systems or even a single work station if appropriate databases are present and can be accessed.

The present invention relates to tokenization, which is generally described in the area of financial transactions as utilizing a "token" (e.g., an alias, substitute, surrogate, or other like identifier) as a replacement for sensitive account information, and in particular account numbers. As such, tokens or portions of tokens may be used as a stand in for a user account number, user name, pin number, routing information related to the financial institution associated with the account, security code, or other like information relating to the user account. The one or more tokens may then be utilized as a payment instrument to complete a transaction. The one or more tokens may be associated with one or more payment devices directly or within one or more digital wallets associated with the payment devices. In other embodiments, the tokens may be associated with electronic transactions that are made over the Internet instead of using a physical payment device. Utilizing a token as a payment instrument instead of actual account information, and specifically an account number, improves security, and provides flexibility and convenience in controlling the transactions, controlling accounts used for the transactions, and sharing transactions between various users.

Tokens may be single-use instruments or multi-use instruments depending on the types of controls (e.g., limits) initiated for the token, and the transactions in which the token is used as a payment instrument. Single-use tokens may be utilized once, and thereafter disappear, are replaced, or are erased, while multi-use tokens may be utilized more than once before they disappear, are replaced, or are erased.

Tokens may be 16-digit numbers (e.g., like credit, debit, or other like account numbers), may be numbers that are less than 16-digits, or may contain a combination of numbers, symbols, letters, or the like, and be more than, less than, or equal to 16-characters. In some embodiments, the tokens may have to be 16-characters or less in order to be compatible with the standard processing systems between merchants, acquiring financial institutions (e.g., merchant financial institution), card association networks (e.g., card processing companies), issuing financial institutions (e.g., user financial institution), or the like, which are used to request authorization, and approve or deny transactions entered into between a merchant (e.g., a specific business or individual user) and a user. In other embodiments of the invention, the tokens may be other types of electronic information (e.g., pictures, codes, or the like) that could be used to enter into a transaction instead of, or in addition to, using a string of characters (e.g., numbered character strings, alphanumeric character strings, symbolic character strings, combinations thereof, or the like).

A user may have one or more digital wallets on the user's payment device. The digital wallets may be associated specifically with the user's financial institution, or in other embodiments may be associated with a specific merchant, group of merchants, or other third parties. The user may associate one or more user accounts (e.g., from the same institution or from multiple institutions) with the one or more digital wallets. In some embodiments, instead of the digital wallet storing the specific account number associated with the user account, the digital wallet may store a token or allow access to a token (e.g., provide a link or information that directs a system to a location of a token), in order to represent the specific account number during a transaction. In other embodiments of the invention, the digital wallet may store some or all of the user account information (e.g., account number, user name, pin number, or the like), including the user account number, but presents the one or more tokens instead of the user account information when entering into a transaction with a merchant. The merchant may be a business, a person that is selling a good or service (hereinafter "product"), or any other institution or individual with which the user is entering into a transaction.

The digital wallet may be utilized in a number of different ways. For example, the digital wallet may be a device digital wallet, a cloud digital wallet, an e-commerce digital wallet, or another type of digital wallet. In the case of a device digital wallet the tokens are actually stored on the payment device. When the device digital wallet is used in a transaction the token stored on the device is used to enter into the transaction with the merchant. With respect to a cloud digital wallet the device does not store the token, but instead the token is stored in the cloud of the provider of the digital wallet (or another third party). When the user enters into a transaction with a merchant, transaction information is collected and provided to the owner of the cloud to determine the token, and thus, how the transaction should be processed. In the case of an e-commerce digital wallet, a transaction is entered into over the Internet and not through a point of sale terminal. As was the case with the cloud digital wallet, when entering into a transaction with the merchant over the Internet the transaction information may be captured and transferred to the wallet provider (e.g., in some embodiments this may be the merchant or another third party that stores the token), and the transaction may be processed accordingly.

Specific tokens, in some embodiments, may be tied to a single user account, but in other embodiments, may be tied to multiple user accounts or groups, as will be described throughout this application. In some embodiments a single tokens could represent multiple accounts, such that when entering into a transaction the user may select the token (or digital wallet associated with the token) and select one of the one or more accounts associated with the token in order to allocate the transaction to a specific account. In still other embodiments, after selection of the token by the user the system may determine the best account associated with the token to use during the transaction (e.g., most cash back, most rewards points, best discount, or the like). In addition, the tokens may be associated with a specific digital wallet or multiple digital wallets as desired by the institutions or users.

Moreover, the tokens themselves, or the user accounts, individual users, digital wallets, or the like associated with the tokens, may have limitations that limit the transactions that the users may enter into using the tokens. The limitations may include, limiting the transactions of the user to a single merchant, a group of multiple merchants, merchant categories, single products, a group a products, product categories, transaction amounts, transaction numbers, geographic locations, or other like limits as is described herein.

FIGS. 1 through 3 illustrate a number of different ways that the user 2 may use one or more tokens in order to enter into a transaction, as well as how the parties associated with the transaction may process the transaction. FIG. 1, illustrates one embodiment of a token system process 1, wherein the token system process 1 is used in association with a tokenization service 50. The tokenization service 50 may be provided by a third-party institution, the user's financial institution, or another institution involved in a transaction payment process. As illustrated in FIG. 1 (as well as in FIGS. 2 and 3), a user 2 may utilize a payment device 4 (or in other embodiments a payment instrument over the Internet) to enter into a transaction. FIG. 1 illustrates the payment device 4 as a mobile device, such as a smartphone, personal digital assistant, or other like mobile payment device. Other types of payment devices 4 may be used to make payments, such as but not limited to an electronic payment card, key fob, a wearable payment device (e.g., watch, glasses, or the like), or other like payment devices 4. As such, when using a payment device 4 the transaction may be made between the point of sale (POS) and the payment device 4 by scanning information from the payment device 4, using near field communication (NFC) between the POS and the payment device 4, using wireless communication between the POS and the payment device 4, or using another other type of communication between the POS and the payment device 4. When entering into an e-commerce transaction over the Internet, for example using the payment device 4 or another device without a POS, a payment instrument (e.g., a payment application that stores the token) may be used to enter into the transaction. The payment instrument may be the same as the token or digital wallet associated with the payment device 4, except they are not associated with specific payment device. For example, the token or digital wallet may be associated with a payment application that can be used regardless of the device being used to enter into the transaction over the Internet.

The token can be associated directly with the payment device 4, or otherwise, through one or more digital wallets associated with the payment device 4. For example, the token may be stored on one or more payment devices 4 directly, and as such any transaction entered into by the user 2 with the one or more payment devices 4 may utilize the token. Alternatively, the payment device 4 may have one or more digital wallets stored on the payment device 4 that allow the user 2 to store one or more user account numbers, or tokens associated with the user account numbers, on the one or more digital wallets. The user may select a digital wallet or account within the digital wallet in order to enter into a transaction using a specific type of customer account. As such, the digital wallets may be associated with the user's issuing financial institutions 40, other financial institutions, merchants 10 with which the user enters into transactions, or a third party institutions that facilitates transactions between users 2 and merchants 10.

As illustrated in FIG. 1, a tokenization service 50 may be available for the user 2 to use during transactions. As such, before entering into a transaction, the user 2 may generate (e.g., create, request, or the like) a token in order to make a payment using the tokenization service 50, and in response the tokenization service 50 provides a token to the user and stores an association between the token and the user account number in a secure token and account database 42. The token may be stored in the user's payment device 4 (e.g., on the digital wallet) or stored on the cloud or other service through the tokenization service 50. The tokenization service 50 may also store limits (e.g., geographic limits, transaction amount limits, merchant limits, product limits, any other limit described herein, or the like) associated with the token that may limit the transactions in which the user 2 may enter. The limits may be placed on the token by the user 2, or another entity (e.g., client, administrator, person, company, or the like) responsible for the transactions entered into by the user 2 using the account associated with the token. The generation of the token may occur at the time of the transaction or well in advance of the transaction, as a one-time use token or multi-use token.

After or during creation of the token the user 2 enters into a transaction with a merchant 10 using the payment device 4 (or payment instrument over the Internet). In some embodiments the user 2 may use the payment device 4 by itself, or specifically select a digital wallet or user account stored within the digital wallet, to use in order to enter into the transaction. The token associated with payment device, digital wallet, or user account within the wallet is presented to the merchant 10 as payment in lieu of the actual user account number and/or other user account information. The merchant 10 receives the token, multiple tokens, and/or additional user account information for the transaction. The merchant 10 may or may not know that the token being presented for the transaction is a substitute for a user account number or other user account information. The merchant also captures transaction information (e.g., merchant, merchant location, transaction amount, product, or the like) related to the transaction in which the user 2 is entering with the merchant 10.

The merchant 10 submits the token (as well as any user account information not substituted by a token) and the transaction information for authorization along the normal processing channels (also described as processing rails), which are normally used to process a transaction made by the user 2 using a user account number. In one embodiment of the invention the acquiring financial institution 20, or any other institution used to process transactions from the merchant 10, receives the token, user account information, and transaction information from the merchant 10. The acquiring financial institution 20 identifies the token as being associated with a particular tokenization service 50 through the token itself or user account information associated with the token. For example, the identification of the tokenization service 50 may be made through a sub-set of characters associated with the token, a routing number associated with the token, other information associated with the token (e.g., tokenization service name), or the like. The acquiring financial institution 20 may communicate with the tokenization service 50 in order to determine the user account number associated with the token. The tokenization service 50 may receive the token and transaction data from the acquiring financial institution 20, and in response, provide the acquiring financial institution 20 the user account number associated with the token as well as other user information that may be needed to complete the transaction (e.g., user name, issuing financial institution routing number, user account number security codes, pin number, or the like). In other embodiments, if limits have been placed on the token, the tokenization service 50 may determine whether or not the transaction information meets the limits and either allows or denies the transaction (e.g., provides the user account number or fails to provide the user account number). The embodiment being described occurs when the token is actually stored on the payment device 4. In other embodiments, for example, when the actual token is stored in a cloud the payment device 4 may only store a link to the token or other token information that allows the merchant 10 or acquiring financial institution to acquire the token from a stored cloud location.

If the acquiring financial institution 20 receives the user account number from the tokenization service 50 (e.g., the tokenization service indicates that the transaction meets the limits), then the acquiring financial institution 20 thereafter sends the user account number, the other user information, and the transaction information directly to the issuing financial institution 40, or otherwise indirectly through the card association networks 30. The issuing financial institution 40 determines if the user 2 has the funds available to enter into the transaction, and if the transaction meets other limits on the user account, and responds with approval or denial of the transaction. The approval runs back through the processing channels until the acquiring financial institution 20 provides approval or denial of the transaction to the merchant 10 and the transaction between the merchant 10 and the user 2 is completed. After the transaction is completed the token may be deleted, erased, or the like if it is a single-use token, or stored for further use if it is a multi-use token.

Instead of the process described above, in which the acquiring financial institution 20 requests the token from the tokenization service 50, in some embodiments the tokenization service 50 may receive the transaction request and transaction information from the merchant 10 or acquiring financial institution 20. Instead of providing the account number to the acquiring financial institution 20, the tokenization service 50 may send the transaction request and transaction information to the issuing financial institution 40 directly or indirectly through the payment association networks 30.

The embodiment illustrated in FIG. 1 prevents the user account number and other user information from being presented to the merchant 10; however, the tokenization service 50, acquiring financial institution 20, the card association networks 30, and the issuing financial institution 40 may all utilize the actual user account number and other user information to complete the transaction.

FIG. 2 illustrates another embodiment of a token system process 1, in which the user 2 may utilize a payment device 4 (or payment instrument over the Internet) to enter into transactions with merchants 10 utilizing tokens instead of user account numbers. As illustrated in FIG. 2, the user may have one or more tokens, which may be associated with the payment device 4, one or more digital wallets within the payment device 4, or one or more user accounts associated with the digital wallets. The one or more tokens may be stored in the user's payment device 4 (or on the digital wallet), or stored on a cloud or other service through the issuing financial institution 40 or another institution. The user 2 may set up the digital wallet by communicating with the issuing financial institution 40 (e.g., the user's financial institution) to request a token for the payment device, either for the device itself, or for one or more digital wallets or one or more user accounts stored on the payment device. As previously discussed, a wallet may be specifically associated with a particular merchant (e.g., received from the merchant 10) and include one or more tokens provided by the issuing financial institution 40 directly (or through the merchant as described with respect to FIG. 3). In other embodiments, the issuing financial institution 40 may create the digital wallet for the user 2 (e.g., through a wallet created for a business client or retail client associated with the user 2) and include one or more tokens for various types of transactions, products, or the like. The issuing financial institution 40 may store the tokens, the associated user account information (e.g., including the user account number), and any limits on the use of the tokens, as was previously described with respect to the tokenization service 50 in FIG. 1. In one embodiment the tokens may include user account information or routing information within the token or tied to the token, which allows the merchants 10 and other institutions in the payment processing systems to route the token and the transaction information to the proper institutions for processing. In other embodiments a tokenization routing database 32 may be utilized to determine where to route a transaction using a token, as described in further detail later.

The user 2 may enter into a transaction with the merchant 10 using a payment device 4 (or a payment instrument through the Internet). In one embodiment the user 2 may enter into the transaction with a token associated with the payment device 4 (or a payment instrument through the Internet). In other embodiments, a specific digital wallet and/or a specific account within the digital wallet may be selected for a particular merchant with whom the user 2 wants to enter into a transaction. For example, the user 2 may select "wallet 1" to enter into a transaction with "merchant 1" and "token 1" to utilize a specific account. The merchant 10 identifies the token, and sends the token and the transaction information to the acquiring financial institution 20. If the token has routing information the acquiring financial institution 20 may route the token and transaction data to the issuing financial institution 40 directly or through the card association networks 30. In situations where the token does not have associated routing information, the acquiring financial institution 20 may utilize a tokenization routing database 32 that stores tokens or groups of tokens and indicates to which issuing financial institutions 40 the tokens should be routed. One or more of the acquiring financial institutions 20, the card association networks 30, and/or the issuing financial institutions 40 may control the tokenization routing database in order to assign and manage routing instructions for tokenization across the payment processing industry. The tokenization routing database 32 may be populated with the tokens and the corresponding issuing financial institutions 40 to which transactions associated with the tokens should be routed. However, in some embodiments no customer account information would be stored in this tokenization routing database 32, only the instructions for routing particular tokens may be stored.

Once the token and transaction details are routed to the issuing financial institution 40, the issuing financial institution 40 determines the user account associated with the token through the use of the token account database 42. The financial institution determines if the funds are available in the user account for the transaction and if the transaction information meets other limits by comparing the transaction information with the limits associated with the token, the user account associated with the token, or other limits described herein. If the transaction meets the limits associated with the token or user account, then the issuing financial institution 40 allows the transaction. If the transaction information does not meet one or more of the limits, then the issuing financial institution 40 denies the transaction. The issuing financial institution sends a notification of the approval or denial of the transaction back along the channels of the transaction processing system to the merchant 10, which either allows or denies the transaction.

The embodiment illustrated in FIG. 2 allows the user and the financial institution to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

FIG. 3 illustrates another embodiment of the token system process 1, in which the user 2 may utilize a payment device 4 (or payment instrument over the Internet) to enter into transactions with a merchant 10 utilizing a token instead of a user account number and/or other user account information. As illustrated in FIG. 3, the user 2 may have one or more tokens associated with the payment device 2, the one or more digital wallets, or one or more user accounts within the digital wallets. The one or more tokens may be stored in the user's payment device 4 (or within the digital wallet), or stored on a cloud or other service through the issuing financial institution 40 or another institution. The user 2 may set up the digital wallet by communicating with the issuing financial institution 40 (e.g., the user's financial institution) and/or the merchant 10 to request a token for the payment device 4, either for the payment device 4 itself, for the one or more digital wallets stored on the payment device 4, or for user accounts within the digital wallet. The financial institution 40 may have a dedicated group of tokens that are associated with a specific merchant, and as such the merchant 10 and the issuing financial institution 40 may communicate with each other to provide one or more tokens to the user 2 that may be specifically associated with the merchant 10. For example, the issuing financial institution may provide a set of tokens to "merchant 1" to associate with "wallet 1" that may be used by one or more users 2. As such "Token 10" may be associated with "wallet 1" and be specified only for use for transactions with "merchant 1."

The merchant 10 may provide the specific tokens from the financial institution 40 to the user 2, while the financial institution 40 may store the user account information with the token provided to the user 2. The financial institution may communicate directly with the user 2, or through the merchant 10 in some embodiments, in order to associate the token with the user 2. Since the merchant 10 provides, or is at least notified by the financial institution 40, that a specific token, or groups of tokens, are associated with a specific issuing financial institution 40, then the merchant 10 may associate routing information and transaction information with the token when the user 2 enters into a transaction with the merchant 10 using the token.

The merchant 10 passes the token (and potentially other user account information), routing information, and transaction information to the acquiring financial institution 20 using the traditional payment processing channels. The acquiring financial institution 20, in turn, passes the token (and potentially other user account information) and transaction information to the issuing financial institution 40 directly, or indirectly through the payment association networks 30 using the routing information. The issuing financial institution 40 accesses the token and account database 42 to identify the user account associated with the token and determines if the transaction information violates any limits associated with the token or the user account. The issuing financial institution 40 then either approves or denies the transaction and sends the approval or denial notification back through the payment processing system channels to the merchant 10, which then notifies the user 2 that the transaction is allowed or denied.

As is the case with the token system process 1 in FIG. 2, the token system process 1 in FIG. 3 allows the user 2 and the financial institution 40 to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

The embodiments of the invention illustrated in FIGS. 1 through 3 are only example embodiments of the invention, and as such it should be understood that combinations of these embodiments, or other embodiments not specifically described herein may be utilized in order to process transactions between a user 2 and merchant 10 using one or more tokens as a substitute for user account numbers or other user account information, such that the merchant 10, or other institutions in the payment processing system do not have access to the actual user accounts or account information.

As briefly discussed above, if the issuing financial institution 40 creates the digital wallet not only does the issuing financial institution 40 receive transaction information along the normal processing channels, but the financial institution 40 may also receive additional transaction information from the user 2 through the digital wallet using the application program interfaces (APIs) or other applications created for the digital wallet. For example, geographic location information of the user 2, dates and times, product information, merchant information, or any other information may be transmitted to the issuing financial institution 40 through the APIs or other applications to the extent that this information is not already provided through the normal transaction processing channels. This additional transaction information may assist in determining if the transactions meet or violate limits associated with the tokens, user accounts, digital wallets, or the like.

Alternatively, if the merchant 10 or another institution, other than the issuing financial institution 40, provides the digital wallet to the user 2, the issuing financial institution 40 may not receive all the transaction information from the traditional transaction processing channels or from the digital wallet. As such, the issuing financial institution 40 may have to receive additional transaction information from another application associated with the user 2 and compare the transaction information received through the traditional channels in order to associate the additional information with the transaction. In other embodiments, the issuing financial institutions 40 may have partnerships with the merchants 10 or other institutions to receive additional transaction information from the digital wallets provided by the merchants or other institutions when the users 2 enter into transactions using the digital wallets.

Moreover, when there is communication between the digital wallets of the users 2 and the issuing financial institution 40 or another institution, transactions in which the user 2 may enter may be pre-authorized (e.g., pre-qualified) to determine what accounts (e.g., tokens) may be used to complete the transaction, without having to arbitrarily choose an account for the transaction. In the case when there are multiple digital wallets or multiple accounts, the account that is pre-authorized or the account that provides the best rewards may be automatically chosen to complete the transactions.

Additional embodiments of the invention will now be described in further detail in order to provide additional concepts and examples related to how tokens may be utilized in these illustrated token system processes 1 or in other token system processes not specifically described in FIGS. 1 through 3.

Turning now to FIG. 4, a system and method are disclosed for providing a virtual value token. In an embodiment, a virtual value token is a token as defined herein having a monetary value funded by a known currency. In an embodiment, the token has a virtual value that is converted into a virtual value and can then be converted into a local currency at a time of transaction. In some embodiments, the system and method provide the virtual value token by receiving a request for a token associated with a virtual value; generating the token associated with the virtual value, wherein the virtual value is funded via a known currency; determining that a user is initiating a transaction using the token; determining a local currency for the transaction; converting at least a portion of the virtual value into a converted amount in the local currency; and completing the transaction using the converted amount of the token.

In block 402, the system receives a request for a token associated with a virtual value. In an embodiment, the system receives the request from a user, such as a customer of a financial institution. In some embodiments, the system receives the request from a non-customer of the financial institution. For example, a gift card may be purchased by a user and the user may activate the virtual value on the gift card without previously being a customer of the financial institution issuing the gift card. In this manner, the system receives the request for the token associated with the virtual value when the gift card is activated. The request may be made electronically, over the phone, in person, or the like.

In an embodiment, the virtual value is a defined value. For example, a user may request a token having a virtual value equivalent to $500.00 U.S. dollars on a certain date. In this manner, the virtual value is defined based on the known currency and the time and/or date of request. The virtual value may be different if the request was made at a different date. In an embodiment, the defined value does not change over time.

In some embodiments, the virtual value is a relative value. A relative value is a value that is related to a number that moves over time. For example, the relative value may the value of $500.00 U.S. dollars at the time of some future transaction. Because of inflation, the value of $500.00 U.S. dollars in the future is not known. In another example, a relative value may be the value of a certain amount of a commodity. While the amount stays the same, the value of the commodity changes over time. In a still further example, the relative value is the underlying value of an account. For example, an investment account may change in value daily or hourly based on changes in the investments making up the account.

In block 404, the system generates the token associated with the virtual value. In some embodiments, the virtual value is funded via a known currency. In an embodiment, the system generates the token in a mobile wallet application of the user. As discussed herein, the token may be an alias, substitute, or surrogate identifier used as a replacement for sensitive account information such as the account number of the user. The system may generate the token in response to the request or may access a database having pre-existing tokens and select the appropriate token from the database, thereby effectively generating the token in response to the request.

In an embodiment, the token is funded by a known currency when the token is generated. For example, funds from the person or entity making the request may be transferred from an account of the requester to the financial institution providing the token. In an embodiment, the token is purchased by the requester when the token is generated. In another embodiment, the token is purchased by a first party, for example a parent, but the token is generated for a second party, for example a child.

In an embodiment, a known currency is a currency that is capable of being converted into another currency on a financial market. For example, currencies listed on exchanges are considered to be known currencies. Similarly, virtual currencies such as bitcoins, points in rewards systems that can be bought and/or sold on a marketplace (e.g., from the issuer of the rewards points), points associated with social media and/or gaming systems, and the like, may also be considered a known currency if they can be transferred with other types of currencies.

In some embodiments, the virtual token is denominated in a known currency in order to assist the user in evaluating the value of the token. In still further embodiments, the virtual token is denominated in a proprietary unit specific to the user, the institution, and/or the underlying value. For example, the virtual token may be denominated in shares of an underlying asset. The virtual token may comprise shares of an account. In an exemplary embodiment, a user may receive a virtual token having the value of an underlying investment account. The virtual token is denominated in shares of the investment account, e.g., 300 shares of stock X, which have a relative value because the value of each share is changing. When the user conducts a transaction, a certain amount of shares of stock X may be converted to the local currency in order to complete the transaction in the local amount.

In block 406, the system determines that a user is initiating a transaction using the token. The system may determine that the user is initiating the transaction based on receiving a request from a merchant to process the transaction. For example, a user may be attempting to purchase a product at a merchant. The user provides the token to the merchant to pay for the product, such as via a mobile wallet on a mobile device. The merchant queries the financial institution providing the token to determine whether funds are available to complete the purchase. At this point, the system determines that the user is initiating the transaction. In another embodiment, the system determines that the user is initiating the transaction based on feedback from the mobile wallet of the user. For example, the mobile wallet may communicate wirelessly to the financial institution when the token in the mobile wallet is activated for a transaction.

As used herein, a transaction is a type of financial transaction whereby funds are transferred from one entity to another entity or from one account to another account. For example, an exemplary use of the token is as a surrogate for purchasing products or services in place of the user's actual account number. The transaction may be a purchase, sale, loan, transfer, or the like. In an embodiment, the transaction is a deposit into account. For example, a user may use the token to deposit funds at an ATM in the local currency.

In block 408, the system determines a local currency for the transaction. In some embodiments, the system determines the local currency based on the information received from the merchant. For example, the merchant may indicate that the total amount of the transaction is denominated in a specific currency. In another example, the mobile wallet receives the request for the transaction information and determines the currency based on the request.

In a further embodiment, a positioning system device or system associated with the token, for example a GPS unit in a phone associated with the mobile wallet comprising the token, determines a location when the transaction is initiated. In another embodiment, a location is determined based on a wireless network to which the device is connected. The location of the mobile device, and hence transaction, may be used to determine a local currency based on tables comprising locations, coordinate-lookup tools, and currencies.

In a still further embodiment, the user may input the local currency. For example, the system may receive an input from the user wherein the user selects a currency from a list, e.g., a list of common currencies, recently used currencies, potential currencies, and the like. In some embodiments, the user inputs the location and the currency is looked up by the system.

The financial institution generates the token associated with the virtual value and makes the token available to the user. In some embodiments, the token has a value on the books of the financial institution or associated with a user account of the user. As discussed, the value is funded by a known currency and may be equivalent to a defined or relative value, such as a defined amount based on a specific currency amount on a specific day or a relative amount based on market value of an underlying asset.

In block 410, the system converts at least a portion of the virtual value into a converted amount in the local currency. When the system determines that the transaction is initiated using the token, the system converts at least a portion of the virtual value into a converted amount in the local currency. For example, the system may determine that a purchase transaction is occurring in a different currency from the currency that was used to fund the token. The system determines whether the value of the token, which may be defined or relative, is sufficient to cover the full amount of the purchase transaction. In this example, the system may determine the value of the token in the local currency before converting in order to determine whether the value of the token is sufficient to cover the full amount of the purchase transaction.

If the value of the token is sufficient, the portion of the token that is equivalent to the full value of the transaction is converted into the local currency. In a first embodiment, the institution providing the token includes conversion rates between the value of the token and the local currency. For example, the financial institution offering the token may have a list of conversion rates between the value of the token, in whatever units are used to denominate the token, and units of one or more currencies into which the token can be converted.

The converted funds comprise a converted amount that may be used to complete the transaction. In some embodiments, the converted funds are combined with funds from other sources, such as sources unrelated to the token, in order to complete the transaction.

In block 412, the system completes the transaction using the converted amount of the token. As discussed herein, completing the transaction may include providing the token to the merchant in order for the merchant to initiate transfer from the user's funds to the merchant's account in exchange for a good or service.

Advantageously, the virtual token permits a user to convert funds into a foreign currency at the time of transaction and in the amount needed. The user does not need to remember to convert funds in advance and does not need to wonder how much to convert or whether excess will remain at the end of the trip. Because the conversion occurs at the time of the transaction, the user may conduct transactions in any currency into which the value can be converted, while maintaining the benefits of the token structure. It should be understood that the description of the virtual token for foreign exchange or foreign exchange token is not intended to be limiting. Other elements and disclosure included herein, including disclosure relating to the multi-currency token of FIG. 5, may be included in the virtual token without departing from the disclosure herein.

Turning now to FIG. 5, a system and method of providing a multi-currency token is provided, in accordance with an embodiment of the disclosure. In an embodiment, the method includes receiving a request for a multi-currency token, wherein the multi-currency token is associated with at least two financial institution partners; determining a value of the multi-currency token; establishing currency conversion parameters for the multi-currency token based on at least one of the value of the multi-currency token and a conversion rate between currencies associated with the at least two financial institution partners; determining that a transaction is being performed with the multi-currency token, the transaction associated with a local currency; and completing the transaction with the multi-currency token in the local currency when the local currency when the local currency is a currency associated with at least one of the financial institution partners.

In block 502, the system receives a request for a multi-currency token. The request may include a funding amount for the multi-currency token and instructions on which currencies the user wishes the multi-currency token be denominated in. In an embodiment, the multi-currency token is associated with at least two financial institution partners. As used herein, the multi-currency token is a token having funds denominated in more than one currency. In a first embodiment, the multi-currency token has a single amount that is denominated in more than one currency. In a second embodiment, the multi-currency token has at least a first amount in a first currency and at least a second amount in a second currency.

In some embodiments, the system receives the request electronically. For example, the system may receive a request from a user to convert a single currency token into a multi-currency token. The user may be traveling and desire to use the token in a different currency than the token was issued in. In some embodiments, the system receives the request for the token through an application, such as a mobile wallet application. The request may be made over the phone, via text message, via email, in person at a financial institution, or the like.

In an embodiment, the multi-currency token is associated with at least two financial institution partners. For example, the multi-currency token may be associated with a first financial institution in a first country and a second financial institution in a second country. Typically, the two financial institutions have a contractual arrangement allowing them to cross-issue tokens in their respective currencies. In an embodiment, each financial institution backs funds on the multi-currency token in their respective currencies, enabling native transactions to be performed in these funds without need for conversion.

In block 504, the system determines a value of the multi-currency token, in accordance with an embodiment of the disclosure. In an embodiment, the system determines the value of the multi-currency token based on a request from the user. For example, the user may request a multi-currency token valued at $500.00 US dollars. In another embodiment, the system may determine the value of the multi-currency token based on a defined value or a relative value, as discussed herein. In some embodiments, the financial institution partners agree in advance on a value for the multi-currency token based on a value of the first currency and a value of the second currency.

In block 506, the system establishes currency conversion parameters for the multi-currency token based on at least one of a value of the multi-currency token and a conversion rate between currencies associated with the at least two financial institution partners, in accordance with an embodiment of the disclosure. Currency conversion parameters are the parameters that permit a single value to be denominated in multiple currencies. For example, currency conversion parameters may include conversion rates between two or more currencies, time periods during which the conversion rates are applicable, sliding conversion rates based on amount being converted, and the like. The currency conversion parameters are used by the system to set the value of the token in the different currencies. For example, the currency may be worth a first amount in a first currency and a second amount in a second currency based on the currency conversion parameters when the multi-currency token is generated.

In a first embodiment, the currency conversion parameters are based at least in part on the value of the multi-currency token. In some embodiments, higher value tokens have lower conversion rates between currencies than lower value tokens. For example, a financial institution may be more willing or able to cross-issue a token for a larger amount than a token for a smaller amount. The lower conversion rates then provide an incentive for the user to request higher value multi-currency tokens. The currency conversion parameters may vary continuously based on the value or may vary based on tiers or levels.

In a second embodiment, the currency conversion parameters are based on the conversion rate between currencies associated with the at least two financial institution partners. For example, the system may evaluate market rates for converting funds between the two or more currencies in order to determine the value of the token in both currencies. In another embodiment, the conversion rate is modified based on the contractual agreement between the financial institution partners. The conversion rate may be lower than market rates because of the contractual agreement.

In an embodiment, the currencies that are the basis of the currency conversion parameters are associated with the financial institution partners. In other words, the currencies are the local or primary currencies of the financial institutions.

In block 508, the system determines that a transaction is being performed with the multi-currency token, in accordance with an embodiment of the disclosure. In some embodiments, the transaction is associated with a local currency. As disclosed herein, various methods can be used to determine that the transaction is being performed or initiated. For example, the system can determine that the transaction is being performed based on a request from a merchant to approve a transaction. In another example, the mobile wallet comprising the multi-currency token may notify the system that the transaction is being performed or the user may indicate that the transaction is being performed, such as via an application on a mobile device.

The transaction typically has a local currency, which is the primary currency in use and accepted by the second party associated with the transaction. For example, a merchant may have a primary local currency that the merchant prices goods and services in. The local currency may be determined based on the location of the transaction, information from the merchant, mobile wallet, and/or user, or determined by one or more of the financial institutions associated with the multi-currency token.

In block 510, the system completes the transaction with the multi-currency token in the local currency when the local currency is a currency associated with at least one of the financial institution partners, in accordance with an embodiment of the disclosure. In some embodiments, the system evaluates the local currency, determines if the local currency is one of the currencies in which the value of the multi-currency token is denominated, and completes the transaction in the local currency denominated on the multi-currency token when possible. If the local currency is not denominated on the multi-currency token, the system may complete the transaction in a non-local currency as if the user is using a credit card in a non-local currency.

Advantageously, the multi-currency token permits a user to convert funds into a foreign currency before the transaction and denominate the funds in more than one value. The user is certain of the conversion rate but also is not limited to using funds in a foreign currency. For example, if the user requests a multi-currency token having a value of $500 US dollars and an equivalent amount of Euros, but the user only uses $100 U.S. dollars worth of value in Euros on a trip to Europe, the user does not need to convert the funds back into U.S. dollars. Instead, the user can use the remaining $400 U.S. dollars worth of value on the multi-currency token in U.S. dollars. It should be understood that the description of the multi-currency token is not intended to be limiting. Other elements and disclosure included herein, including disclosure relating to the virtual token of FIG. 4, may be included in the multi-currency token without departing from the disclosure herein.

A further advantage of the system is that the financial institution offering the token may time the conversion to benefit from favorable conversion rates. For example, the system may determine based on historical spending patterns that a larger proportion of customers travel to a foreign country during a specific time of year, e.g., Europe in the summer, South America in Dec., or the like. The system may purchase currency or options to purchase currency at a specific rate when conversion rates are favorable for the purchase, and then use the converted currency for the virtual value or multi-currency token at a later date. In this manner, the financial institution benefits from flexible timing while still providing convenience to the customer.

To supplement the present disclosure, this application further incorporates entirely by reference the following commonly assigned patent applications:

| Docket Number | U.S. Patent Application Ser. No. | Title | Filed On |
| --- | --- | --- | --- |
| 6070US1.014033.2138 | | MANAGED DIGITAL WALLETS | Concurrently Herewith |
| 6071U51.014033.2153 | | TOKEN COLLABORATION NETWORK | Concurrently Herewith |
| 6071U52.014033.2154 | | FORMATION AND FUNDING OF A SHARED TOKEN | Concurrently Herewith |
| 6072U51.014033.2151 | | LIMITING TOKEN COLLABORATION NETWORK USAGE BY USER | Concurrently Herewith |
| 6072U52.014033.2152 | | LIMITING TOKEN COLLABORATION NETWORK USAGE BY TOKEN | Concurrently Herewith |
| 6073U51.014033.2149 | | LIMITING THE USE OF A TOKEN BASED ON A USER | Concurrently Herewith |
| 6073U52.014033.2150 | | AUTHORIZING A TEMPORARY TOKEN FOR A USER | Concurrently Herewith |
| 6074U51.014033.2148 | | CONTROLLING TOKEN ISSUANCE BASED ON | Concurrently Herewith |
| 6075U51.014033.2146 | | FLEXIBLE FUNDING ACCOUNT TOKEN ASSOCIATIONS | Concurrently Herewith |
| 6075U52.014033.2147 | | ACCOUNT TO ASSOCIATIONS BASED ON SPENDING THRESHOLDS | Concurrently Herewith |
| 6076U51.014033.2144 | | ONLINE BANKING DIGITAL WALLET MANAGEMENT | Concurrently Herewith |
| 6076U52.014033.2145 | | CUSTOMER TOKEN PREFERENCES INTERFACE | Concurrently Herewith |
| 6076U53.014033.2172 | | CREDENTIAL PAYMENT OBLIGATION VISIBILITY | Concurrently Herewith |
| 6077US1.014033.2143 | | PROVIDING SUPPLEMENTAL ACCOUNT INFORMATION IN DIGITAL WALLETS | Concurrently Herewith |
| 6078U51.014033.2142 | | PROVIDING OFFERS ASSOCIATED WITH PAYMENT CREDENTIALS IN DIGITAL WALLETS | Concurrently Herewith |
| 6078U52.014033.2179 | | PROVIDING OFFERS ASSOCIATED WITH PAYMENT CREDENTIALS AUTHENTICATED IN A SPECIFIC DIGITAL WALLET | Concurrently Herewith |
| 6079U52.014033.2173 | | FOREIGN CROSS-ISSUED TOKEN | Concurrently Herewith |

-continued

| Docket Number | U.S. Patent Application Ser. No. | Title | Filed On |
|---|---|---|---|
| 6080U51.014033.2140 | | DIGITAL WALLET EXPOSURE REDUCTION | Concurrently Herewith |
| 6080U52.014033.2174 | | MOBILE DEVICE CREDENTIAL EXPOSURE REDUCTION | Concurrently Herewith |
| 6081U51.014033.2139 | | ATM TOKEN CASH WITHDRAWAL | Concurrently Herewith |
| 014033.002194 | | RESTORING OR REISSUING OF A TOKEN BASED ON USER AUTHENTICATION | Concurrently Herewith |
| 014033.002195 | | TOKEN USAGE SCALING BASED ON DETERMINED LEVEL OF EXPOSURE | Concurrently Herewith |

It is understood that the servers, systems, and devices described herein illustrate one embodiment. It is further understood that one or more of the servers, systems, and devices can be combined in other embodiments and still function in the same or similar way as the embodiments described herein.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present disclosure may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as, for example, a propagation signal including computer-executable program code portions embodied therein.

One or more computer-executable program code portions for carrying out operations of the present disclosure may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F#.

Some embodiments of the present disclosure are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present disclosure.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the disclosure. Therefore, it is to be understood that, within the scope of the appended claims, the disclosure may be practiced other than as specifically described herein.

What is claimed is:

1. An apparatus for use in a token-based transaction system, wherein the apparatus converts a virtual value token into a local currency to complete transactions, the apparatus comprising:
   a memory;
   a computing processor; and
   a module stored in the memory, said module comprising instruction code executable by one or more computing processors, and configured to:
      present a digital wallet management interface to a mobile device of a user, the mobile device of the user comprising a global positioning system, and the digital wallet management interface configured to:
      present at least one original virtual value token having a set of transaction limitations and at least one digital wallet associated with the original virtual value token; and
      present a travel toggle switch configured for graphical manipulation by the user between at least a first position and a second position, wherein the first position corresponds to the user not traveling and the second position corresponds to the user traveling;
      in response to the travel toggle switch moving from the first position to the second position, deactivate and destroy the original virtual value token;
      in response to the travel toggle switch moving from the first position to the second position, issue a new virtual value token having a new set of transaction limitations to the at least one digital wallet, wherein the virtual value of the new virtual value token is an amount available to use in the transactions, and wherein the virtual value is a market value of an underlying asset that varies in value;
      determine that the user is initiating a transaction comprising a transaction amount using the new virtual value token, wherein the apparatus receives the new virtual value token during initiation of the transaction but prior to completion of the transaction;
      receive a geographical location of the mobile device of the user from the global positioning system of the mobile device of the user;
      determine a local currency for the transaction based on a comparison of the geographical location of the mobile device of the user and a database comprising local currencies associated with geographical locations, wherein the local currency is different from the known currency;
      determine a conversion rate between the local currency and the known currency;
      convert at least a portion of the market value comprising the virtual value of the new virtual value token into a converted amount in the local currency based on the transaction amount in the local currency and the conversion rate, wherein the converted amount is at least as much as the transaction amount; and
      complete the transaction using the converted amount of the new payment token in the local currency.

2. The apparatus of claim 1, wherein the virtual value of the original virtual value token is a defined amount of a specific currency used to fund the virtual value token on a certain date.

3. The apparatus of claim 1, wherein the virtual value of the new virtual value token is a market value of an investment account in a known currency, wherein the investment account comprises a plurality of shares of stock.

4. The apparatus of claim 1, wherein the virtual value of the new virtual value token is denominated in units of the underlying asset.

5. The apparatus of claim 1, wherein converting at least a portion of the virtual value of the virtual value token into a converted amount in the local currency comprises:
   determining a total amount of the transaction;
   determining that the virtual value is greater than or equal to the total amount of the transaction; and
   converting an amount of the virtual value equivalent to the total amount of the transaction into the local currency.

6. The apparatus of claim 5, wherein completing the transaction using the converted amount of the new payment token comprises transferring funds to a merchant in the local currency.

7. A computer program product for use in a token-based transaction system, wherein the apparatus converts a virtual value token into a local currency to complete transactions, the computer program product comprising:
   a non-transitory computer-readable medium storing programmed instructions that when executed by the processor performs the steps of:
      present a digital wallet management interface to a mobile device of a user, the mobile device of the user comprising a global positioning system, and the digital wallet management interface configured to:
      present at least one original virtual value token having a set of transaction limitations and at least one digital wallet associated with the original virtual value token; and
      present a travel toggle switch configured for graphical manipulation by the user between at least a first position and a second position, wherein the first position corresponds to the user not traveling and the second position corresponds to the user traveling;
      in response to the travel toggle switch moving from the first position to the second position, deactivate and destroy the original virtual value token;
      in response to the travel toggle switch moving from the first position to the second position, issue a new virtual value token having a new set of transaction limitations to the at least one digital wallet, wherein the virtual value of the new virtual value token is an amount available to use in the transactions, and wherein the virtual value is a market value of an underlying asset that varies in value;
      determine that the user is initiating a transaction comprising a transaction amount using the new virtual value token, wherein the apparatus receives the new virtual value token during initiation of the transaction but prior to completion of the transaction;

receive a geographical location of the mobile device of the user from the global positioning system of the mobile device of the user;

determine a local currency for the transaction based on a comparison of the geographical location of the mobile device of the user and a database comprising local currencies associated with geographical locations, wherein the local currency is different from the known currency;

determine a conversion rate between the local currency and the known currency;

convert at least a portion of the market value comprising the virtual value of the new virtual value token into a converted amount in the local currency based on the transaction amount in the local currency and the conversion rate, wherein the converted amount is at least as much as the transaction amount; and complete the transaction using the converted amount of the new payment token in the local currency.

8. The computer program product according to claim 7, wherein the virtual value of the original virtual value token is a defined amount of a specific currency used to fund the virtual value token on a certain date.

9. The computer program product according to claim 7, wherein the virtual value of the new virtual value token is a market value of an investment account in a known currency, wherein the investment account comprises a plurality of shares of stock.

10. The computer program product according to claim 7, wherein the virtual value of the new virtual value token is denominated in units of the underlying asset.

11. The computer program product according to claim 7, wherein converting at least a portion of the virtual value of the virtual value token into a converted amount in the local currency comprises:

determining a total amount of the transaction;

determining that the virtual value is greater than or equal to the total amount of the transaction; and converting an amount of the virtual value equivalent to the total amount of the transaction into the local currency.

12. The computer program product according to claim 11, wherein completing the transaction using the converted amount of the new payment token comprises transferring funds to a merchant in the local currency.

13. A computer-implemented method for use in a token-based transaction system, wherein the apparatus converts a virtual value token into a local currency to complete transactions, the method comprising:

presenting a digital wallet management interface to a mobile device of a user, the mobile device of the user comprising a global positioning system, and the digital wallet management interface configured for:

presenting at least one original virtual value token having a set of transaction limitations and at least one digital wallet associated with the original virtual value token; and presenting a travel toggle switch configured for graphical manipulation by the user between at least a first position and a second position, wherein the first position corresponds to the user not traveling and the second position corresponds to the user traveling;

in response to the travel toggle switch moving from the first position to the second position, deactivating and destroying the original virtual value token;

in response to the travel toggle switch moving from the first position to the second position, issuing a new virtual value token having a new set of transaction limitations to the at least one digital wallet, wherein the virtual value of the new virtual value token is an amount available to use in the transactions, and wherein the virtual value is a market value of an underlying asset that varies in value;

determining that the user is initiating a transaction comprising a transaction amount using the new virtual value token, wherein the apparatus receives the new-virtual value token during initiation of the transaction but prior to completion of the transaction;

receiving a geographical location of the mobile device of the user from the global positioning system of the mobile device of the user;

determining a local currency for the transaction based on a comparison of the geographical location of the mobile device of the user and a database comprising local currencies associated with geographical locations, wherein the local currency is different from the known currency;

determining a conversion rate between the local currency and the known currency;

converting at least a portion of the market value comprising the virtual value of the new virtual value token into a converted amount in the local currency based on the transaction amount in the local currency and the conversion rate, wherein the converted amount is at least as much as the transaction amount; and completing the transaction using the converted amount of the new payment token in the local currency.

14. The computer-implemented method of claim 13, wherein the virtual value of the original virtual value token is a defined amount of a specific currency used to fund the virtual value token on a certain date.

15. The computer-implemented method of claim 13, wherein the virtual value of the new virtual value token is a market value of an investment account in a known currency, wherein the investment account comprises a plurality of shares of stock.

16. The computer-implemented method of claim 13, wherein the virtual value of the new virtual value token is denominated in units of the underlying asset.

17. The computer-implemented method of claim 13, wherein converting at least a portion of the virtual value of the virtual value token into a converted amount in the local currency comprises:

determining a total amount of the transaction;

determining that the virtual value is greater than or equal to the total amount of the transaction; and converting an amount of the virtual value equivalent to the total amount of the transaction into the local currency.

18. The computer-implemented method of claim 17, wherein completing the transaction using the converted amount of the new payment token comprises transferring funds to a merchant in the local currency.

* * * * *